US007133180B2

(12) United States Patent
Ilchenko et al.

(10) Patent No.: US 7,133,180 B2
(45) Date of Patent: Nov. 7, 2006

(54) RESONANT IMPEDANCE MATCHING IN MICROWAVE AND RF DEVICE

(75) Inventors: Vladimir Ilchenko, La Canada, CA (US); Nikolai Morozov, Valley Village, CA (US)

(73) Assignee: OEwaves, Inc., Pasadena, CA (US)

( * ) Notice: Subject to any disclaimer, the term of this patent is extended or adjusted under 35 U.S.C. 154(b) by 115 days.

(21) Appl. No.: 10/859,746

(22) Filed: Jun. 3, 2004

(65) Prior Publication Data

US 2005/0017816 A1 Jan. 27, 2005

Related U.S. Application Data

(60) Provisional application No. 60/475,574, filed on Jun. 3, 2003.

(51) Int. Cl.
*H04B 3/04* (2006.01)

(52) U.S. Cl. ........................ 359/237; 359/254; 359/298

(58) Field of Classification Search ................. 359/237
See application file for complete search history.

(56) References Cited

U.S. PATENT DOCUMENTS

| | | | | |
|---|---|---|---|---|
| 5,617,103 | A * | 4/1997 | Koscica et al. | 343/700 MS |
| 5,723,856 | A | 3/1998 | Yao et al. | |
| 5,777,778 | A | 7/1998 | Yao | |
| 5,917,179 | A | 6/1999 | Yao | |
| 5,929,430 | A | 7/1999 | Yao et al. | |
| 6,488,861 | B1 | 2/2002 | Iltchenko et al. | |
| 6,389,197 | B1 | 5/2002 | Iltchenko et al. | |
| 6,417,957 | B1 | 7/2002 | Yao | |
| 6,473,218 | B1 | 10/2002 | Maleki et al. | |
| 6,476,959 | B1 | 11/2002 | Yao | |
| 6,487,233 | B1 | 11/2002 | Maleki et al. | |
| 6,490,039 | B1 | 12/2002 | Maleki et al. | |
| 6,138,076 | A1 | 3/2003 | Yao | |
| 6,535,328 | B1 | 3/2003 | Yao | |
| 6,567,436 | B1 | 5/2003 | Yao et al. | |
| 6,580,532 | B1 | 6/2003 | Yao et al. | |
| 6,594,061 | B1 | 7/2003 | Huang et al. | |
| 6,762,869 | B1 | 7/2004 | Maleki et al. | |
| 6,858,112 | B1 * | 2/2005 | Flamm et al. | 156/345.48 |
| 2002/0018611 | A1 | 2/2002 | Maleki et al. | |
| 2003/0012504 | A1 | 1/2003 | Iltchenko | |

FOREIGN PATENT DOCUMENTS

WO WO0196936 12/2001

OTHER PUBLICATIONS

L.E. Myers, et al.; Quasi-phase-matched optical parametric oscillators in bulk periodically poled $LiNbO_3$; Nov. 1995; J.Opt. Soc. Am. B/vol. 12, No. 11; pp. 2102-2116.

* cited by examiner

*Primary Examiner*—Scott J. Sugarman
*Assistant Examiner*—Richard Hanig
(74) *Attorney, Agent, or Firm*—Fish & Richardson P.C.

(57) ABSTRACT

This application describes devices and techniques for using microwave or RF resonators to provide DC bias, DC blocking, and impedance matching to microwave or RF devices. Both planar and non-planar implementations may be used.

30 Claims, 6 Drawing Sheets
(1 of 6 Drawing Sheet(s) Filed in Color)

RESONANT IMPEDANCE MATCHING IN MICROWAVE AND RF DEVICE

This application claims the benefit of U.S. Provisional Patent Application No. 60/475,574 entitled "RESONANT PLANAR IMPEDANCE MATCHING SCHEME FOR THE SEMICONDUCTOR MICROWAVE DEVICES" and filed on Jun. 3, 2003, the entire disclosure of which is incorporated herein by reference as part of this application.

The development work for certain technical features described in this application was performed under ATP Contact No. 70NANB1H3054.

BACKGROUND

This application relates to microwave (MW) and radio frequency (RF) components and devices and their applications.

Impedance matching is a condition under which the input impedance matches the output impedance in a microwave or RF device to reduce loss in transmitting a microwave signal. Various microwave and RF devices use LC circuits based on lumped components, microwave stubs, or impedance transformers to achieve the desired impedance matching. These techniques, however, have their limitations. For example, the LC circuits for impedance matching are often limited to low microwave frequencies. The microwave stubs and impedance transformers typically provide impedance matching within about one half of an octave and the corresponding bandwidth may not be sufficiently narrow for some single-frequency microwave and RF devices.

SUMMARY

This application describes devices and techniques that use microwave or RF resonators to provide DC bias, DC blocking, and impedance matching for microwave or RF devices. Implementations may be made in planar configurations such as microstrip resonant lines or in non-planar configurations. For example, one of devices described in this application includes a microwave or RF resonator comprising a conductor material and in resonance with a microwave or RF signal at a signal wavelength, a bias conductor connected to the resonator to supply a DC bias voltage to a location on the resonator where the electric field of the resonant microwave or RF signal has a node, a microwave or RF circuit operates at the signal wavelength, and a signal conductor connecting the circuit to the resonator to apply the DC bias voltage to the circuit. The resonator may be a planar resonator or a non-planar resonator.

In the planar implementations, planar resonance lines may be used to provide desired DC bias, DC block, and impedance matching for single-frequency microwave devices. In one implementation, for example, a device may include a microstrip line having a length of one half of a microwave wavelength, a first conductive pad connected to a center of the microstrip line to supply a DC bias to the microstrip line, a second conductive pad connecting a load to a selected contact location on the microstrip line, and a conductive feed line that is insulated from the microstrip line and is AC coupled to supply a microwave signal to the microstrip line at the microwave wavelength. The selected contact location on the microstrip line is selected to provide a impedance matching condition for transferring the microwave signal from the conductive feed line to the second conductive pad.

In another implementation, a device may include a microstrip feed line to transmit microwave or RF energy, a microstrip resonator positioned to be insulated from the microstrip feed line and coupled to exchange microwave or RF energy with the microstrip feed line, a bias conductor wire connected to the microstrip resonator to supply a DC bias voltage to a location on the microstrip resonator where the electric field of a resonance microwave or RF signal has a node, and a signal conductor wire connected to the microstrip resonator at a location to provide a impedance matching for exchange the microwave or RF energy with the feed line and to receive the DC bias from the microstrip resonator.

A method is also described as an example. In this method, a microstrip feed line and a microstrip resonator are provided so that they are insulated from each other and are coupled to each other to exchange microwave or RF energy therebetween. A DC bias voltage is supplied to a location on the microstrip resonator where the electric field of a resonance microwave or RF signal has a node. In addition, a load is connected to the microstrip resonator at a location to provide a impedance matching for exchange the microwave or RF energy with the feed line and to receive the DC bias from the microstrip resonator.

These and other implementations, examples, and associated advantages are described in detail in the drawings, the detailed description, and the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1B is a cross section view from the direction BB indicated in FIG. 1A.

DETAILED DESCRIPTION

Various microwave or RF devices operating at a single frequency may be configured to include a resonance connection for applying a DC bias and providing the desired impedance matching condition. In the examples described below, an appropriate planar resonance line is used as a distributed auto-transformer. A microstrip or coplanar resonance line may be used for this purpose. Depending upon the impedance of the load, this planar resonance line may be implemented in different configurations, e.g., a λ/2-open or λ/4-short resonance structure, where λ is the microwave wavelength at which the device operates.

Figure 1A:
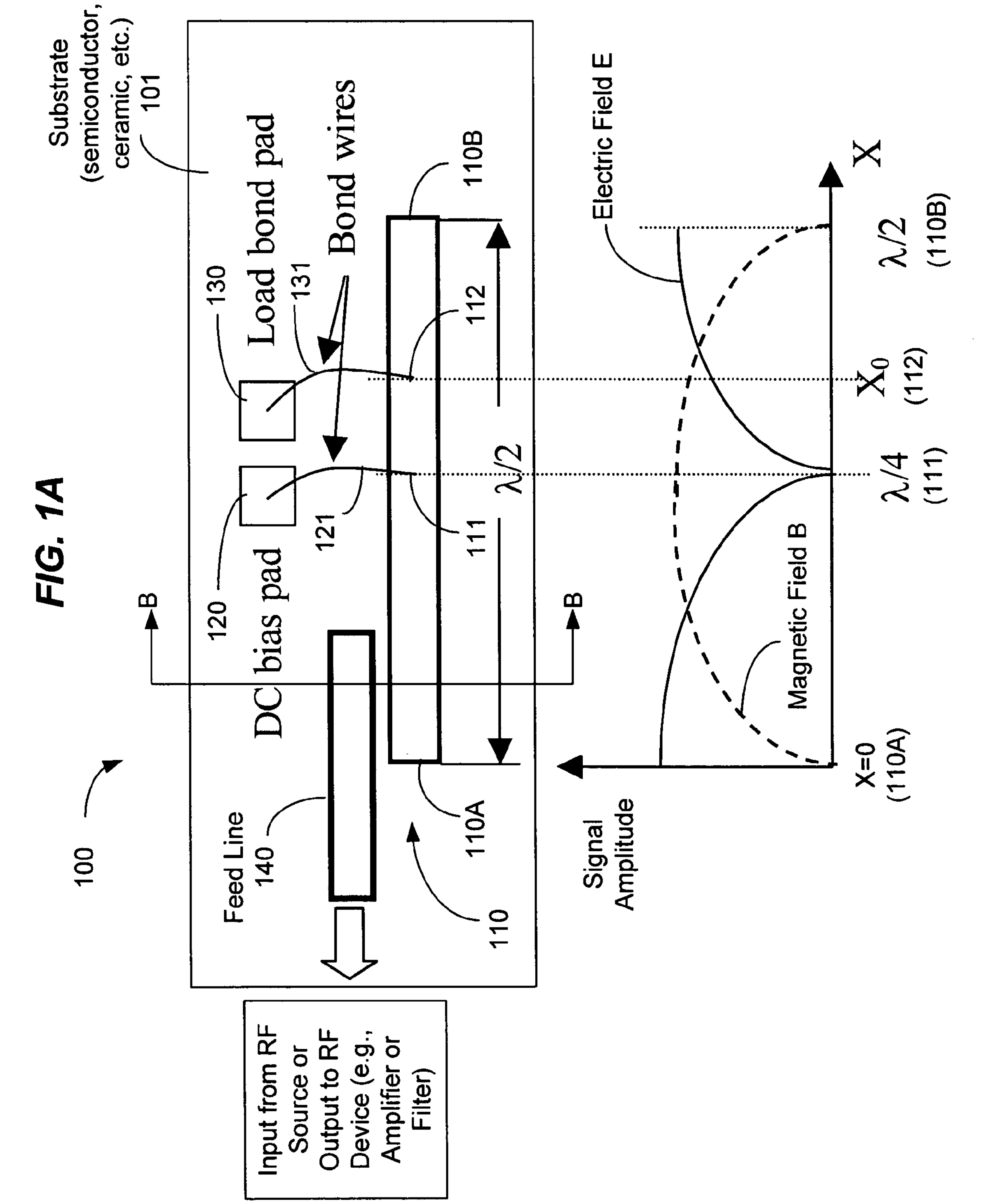
FIGS. 1A and 1B illustrate an example of a microwave or RF device having a λ/2-open microstrip line to provide the DC bias, the DC block and impedance matching, where
Figure 1B:
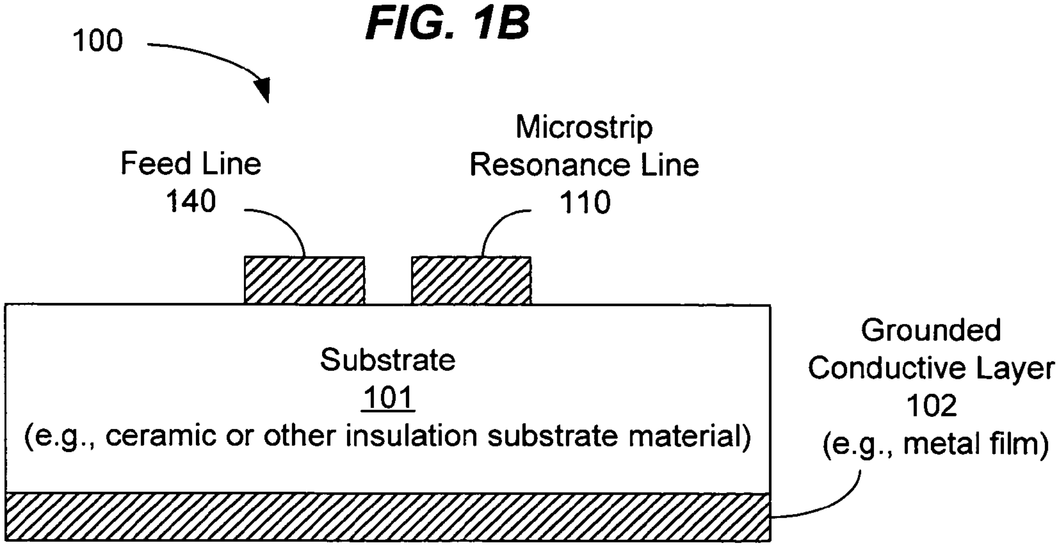

FIG. 1A shows a portion of a microwave or RF device 100 with a λ/2-open microstrip resonance line 110. FIG. 1B shows a cross sectional view of the device 100 along the direction BB as indicated. A substrate 101, which may be made of an electrically insulating material such as a ceramic, a glass, or a semiconductor material, is provided to support the microstrip resonance line 110 and other electrodes. The microstrip line 110 may be formed on one side of the substrate 101. On the opposite side of the substrate 101, a conductive layer 102 may be formed and electrically grounded to support the microwave or RF signal in the microstrip line 110 and other electrodes on the substrate 101.

The microstrip line 110 is generally elongated and has a desired width. The length of the microstrip line 110 is one half of the wavelength λ of the microwave or RF signal. The two ends 110A and 110B of the microstrip line 110 are electrically insulated from other conductive parts and thus the microstrip line 110 is "open" at each end. The electrical field of a microwave signal coupled into the microstrip line 110, under the resonance condition, has a node at the center 111 of microstrip line 110 where the amplitude of the electric field E is essentially zero. The graph in the lower half of FIG. 1A shows the field distribution for both the electric field E represented by a solid line and the magnetic field B represented by a dashed line as a function of the position x along the microstrip line 110.

Accordingly, at the resonance condition, any conductor may be coupled to the center 111 of the microstrip line 110 without significant distortion of the microwave or RF field in the microstrip line 110. As illustrated, a conductive element 120 may be used as a receiver or DC bias pad for receiving a DC bias from, e.g., a DC voltage signal source and a conductive wire 121 may be connected between the center 111 and the conductive element 120 to supply the DC bias voltage to the microstrip line 110.

A conductor 140 such as a microwave or RF feeding line may be positioned near one end, e.g., 110A, of the microstrip line 110 to be AC coupled to but DC insulated from the microstrip line 110. A microwave or RF signal source may be connected to the feeding line 140 to supply a signal to the microstrip line 110 to be transferred to a device coupled to the microstrip line 110. Alternatively, a microwave or RF device may be connected to the feed line 140 to receive a microwave or RF signal from the microstrip line 110. The coupling between the feed line 140 and the microstrip line 110 may be side coupled as shown or gap coupled at the end 110A. Since the microstrip line 110 is DC insulated from the feeding line 140, the microstrip line 110 effectuates a DC block without a complex DC block circuit such as a bias T used in various other microwave or RF devices.

As illustrated in FIG. 1A, a second conductive element or pad 130 may be used to connect to a microwave or RF load or a signal source. A conductive wire 131 may be used to connect the load pad 130 to a selected location 112 (X0) on the microstrip line 110. The ratio of the microwave electrical and magnetic fields (E/B) is the local effective impedance of the microstrip line 110 and varies with the position of the load contact location 112. This effective impedance changes from zero at the center 111 and to a maximum impedance at the either end 110A or 110B. Therefore, the location 112 of the load contact may be selected to make the impedance of the microstrip line 110 match the impedance of the load connected at the load pad 130 so that the signal power can be transferred from the source connected at the pad 140 to the load connected at the pad 130 with a minimum attenuation. The inductance of the wire bond between the microstrip line 110 and the load is part of the impedance matching network in FIG. 1A and thus can contribute to the impedance matching condition. To reduce this inductance, the load pad 130 may be placed in a close proximity to the microstrip line 110 to shorten the wire 131.

Notably, the DC bias voltage applied to the microstrip is line 110 from the DC bias pad 120 is applied to the load bond pad 130 through the wire 131. Therefore, a microwave or RF device connected to the load bond pad 130 receives this DC bias voltage. Therefore, the microstrip line 110 in the configuration in FIGS. 1A and 1B may be used to provide the DC bias, DC block, and impedance matching in one unified simple and compact structure and thus eliminate the need for separate circuit elements for providing the DC bias, DC block, and impedance matching.

The resonance frequency of the microwave or RF signal in the device shown in FIGS. 1A and 1B may be tuned to any desired frequency according to specific applications. In this regard, the length of the microstrip line 110 may be adjusted by trimming to tune the resonance frequency of the device. For example, a tuning range of about 1 GHz may be achieved.

The microstrip resonance line 110 in FIGS. 1A and 1B is shown to be a λ/2-open microstrip resonator as one example. In general, such a microstrip resonance line 110 may be used in a microwave or RF device shown in FIG. 2 to link microwave or RF devices 210 and 230 to each other with the desired DC bias, DC block, and impedance matching. A DC supply 220 may be connected to the DC bias pad 120 to supply a DC bias voltage to the device 210 connected to the load bond pad 130. This DC vias voltage, however, is blocked from reaching the device 230 that is connected to the feed line 140 due to the DC insulation between the feed lien 140 and the microstrip resonator 110. The impedance matching is provided by the microstrip resonator 110. The device 210 may be a number of microwave or RF devices, such as an optical detector, an optical modulator, a transistor, a microwave or RF signal amplifier, and so on.

Figure 2:
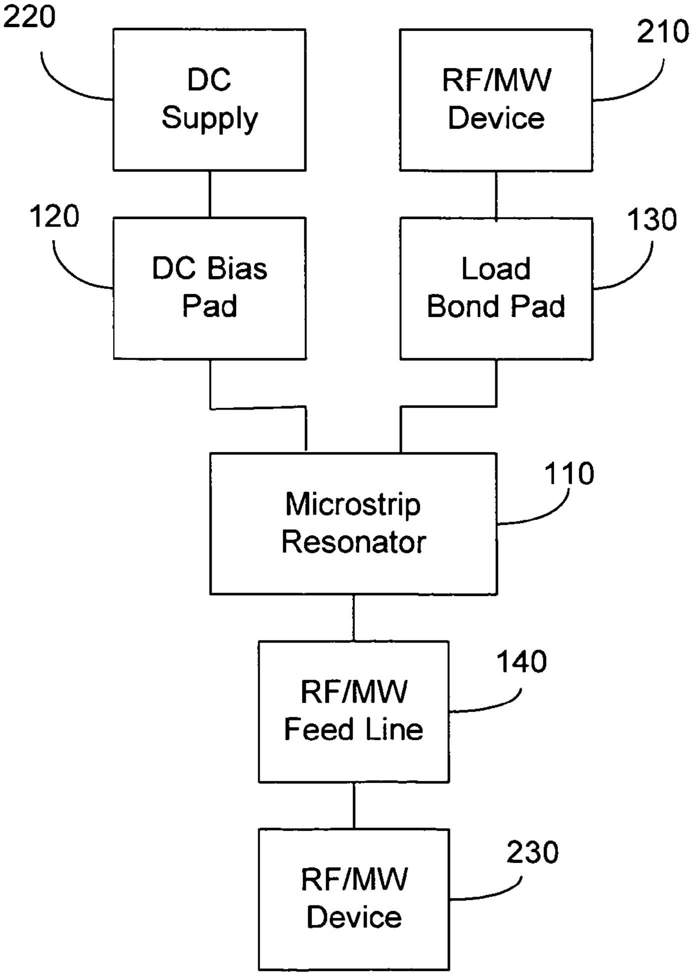
FIG. 2 illustrates functional blocks of a RF or microwave device that implements a microstrip resonator line to provide the DC bias, the DC block and impedance matching, where the microstrip resonator may be, e.g., a λ/2-open microstrip line or a λ/4-short microstrip line.
Figure 3A:
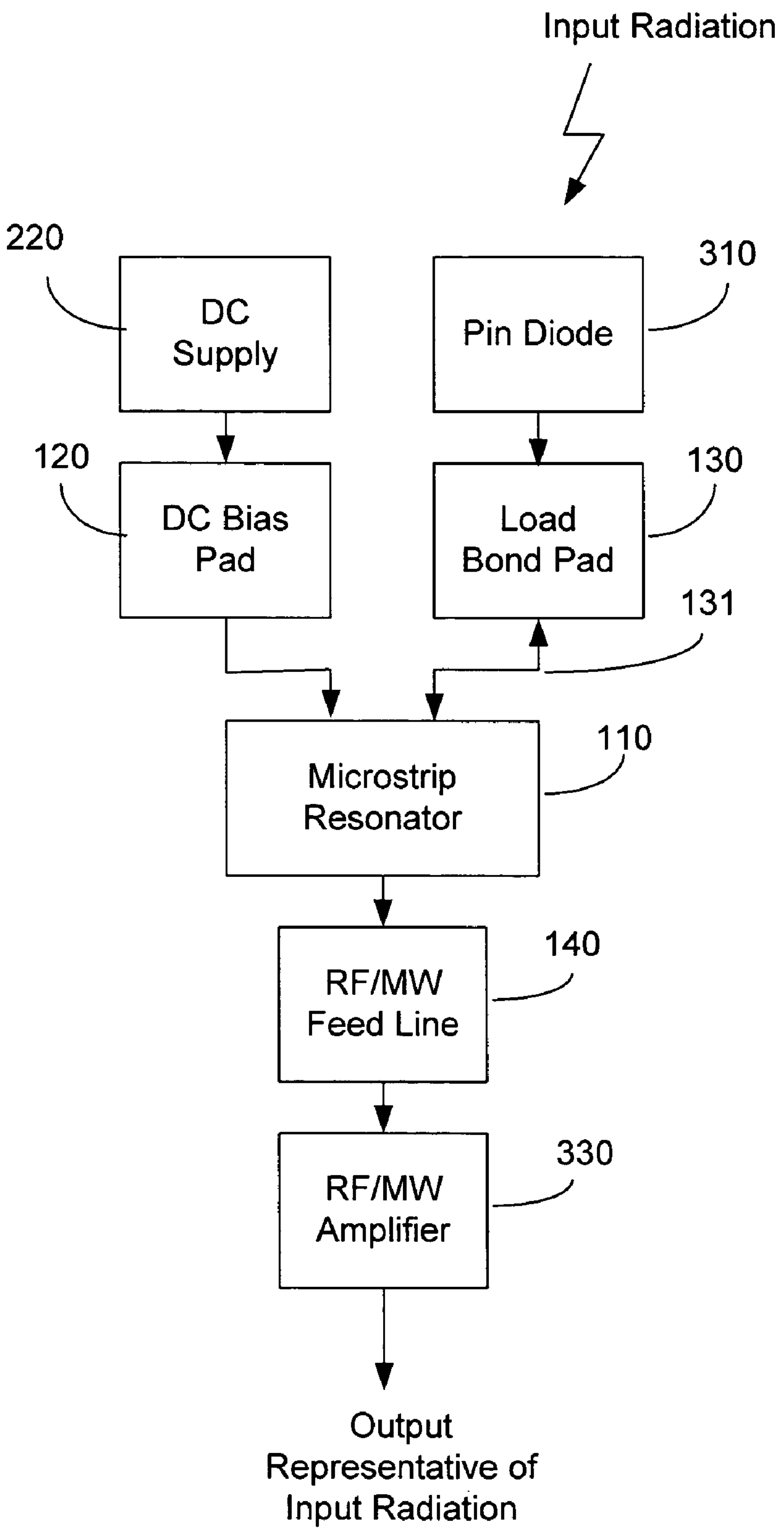
FIG. 3A illustrates one exemplary application of the RF or microwave device in FIG. 2 to a pin diode.

As an example, FIG. 3A illustrates one implementation of the device shown in FIG. 2. In FIG. 3A, a pin diode 310 is used as the device 210 in FIG. 2 to produce a microwave or RF output in response to input radiation received by the pin diode 310. The pin diode 310 is electrical biased by the DC bias voltage applied on the microstrip resonator 110 from the DC supply 220. Under this DC bias, the pin diode 310 responds to the input radiation to produce an output that is transferred to the microstrip resonator 110 via the load bond pad 130 and the wire 131. This output is then coupled to the feed line 140. A microwave or RF amplifier 330 may be connected to the feed line 140 to receive the output from the pin diode 310. Alternatively, a microwave or RF filter may be used as the device 330 to receive the output from the pin diode 310.

In the device in FIG. 3A, the pin diode 310 is just one specific example of a microwave or RF device that operates based on a DC bias and produces a microwave or RF output. Other microwave or RF device may be used as the device 330 in FIG. 3A.

Figure 3B:
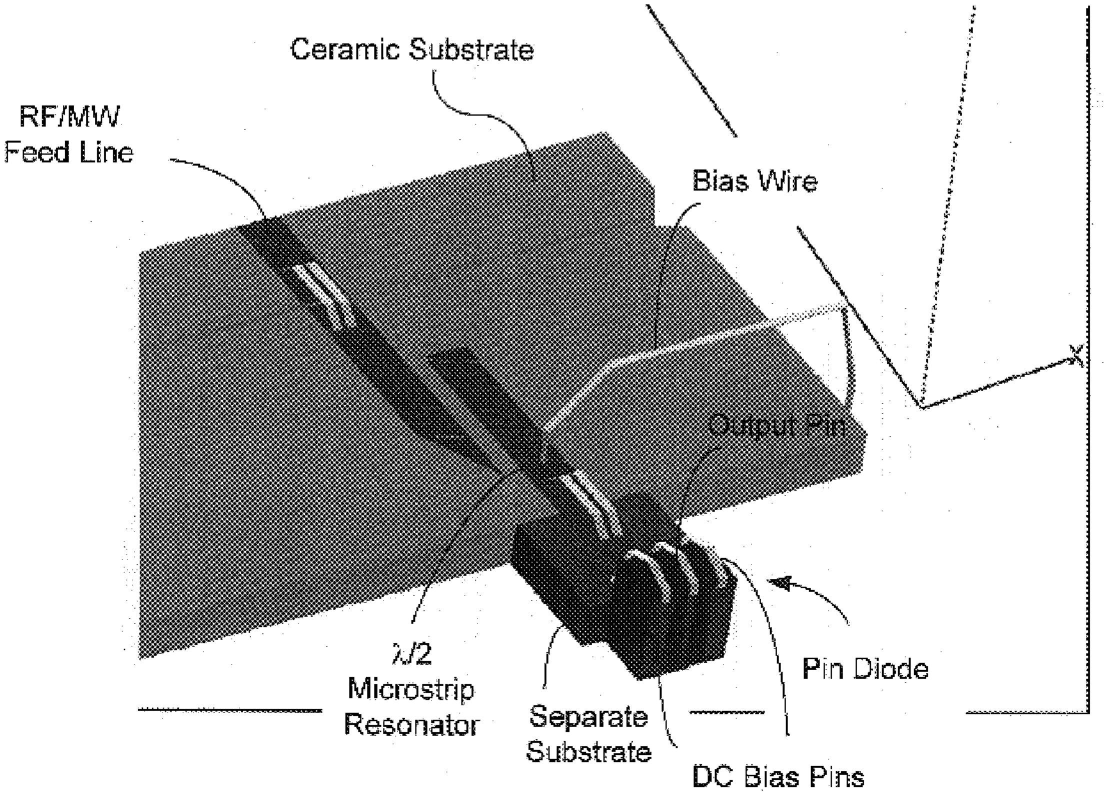
FIG. 3B shows an example of the device in FIG. 3A.
Figure 3C:
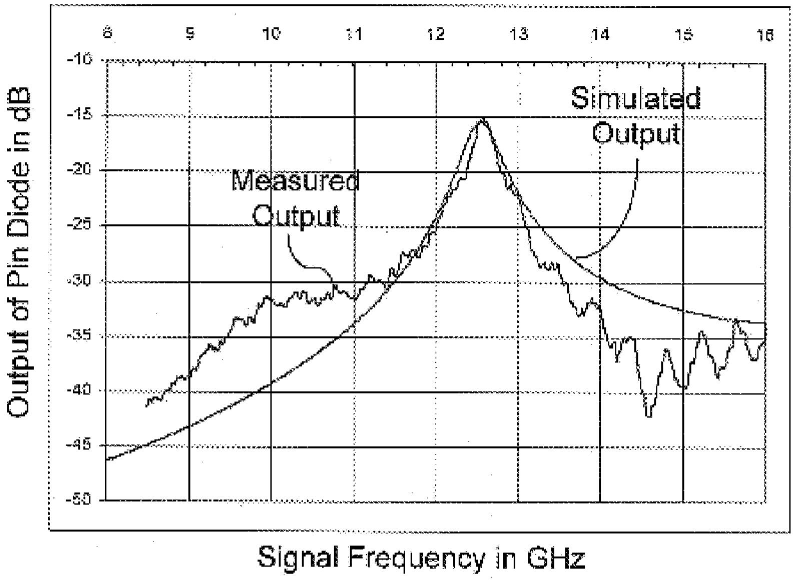
FIG. 3C shows measured output of the pin diode in the is device in FIG. 3B and simulation of the output.

FIG. 3B further shows a specific construction of the device in FIG. 3A. The λ/2 microstrip resonator 110 described above is implemented on two connected substrates. The pin diode has three pins, one output pin in the center and two outer pins for receiving the DC bias. FIG. 3C shows the measured output results of the pin diode for S21 as a function of frequency and the simulated output from the pin diode. The matching structure was modeled using ANSOFT HFSS™ 3-dimensional electro-magnetic simulation software. The measurements and the simulation are consistent with each other.

Figure 4:
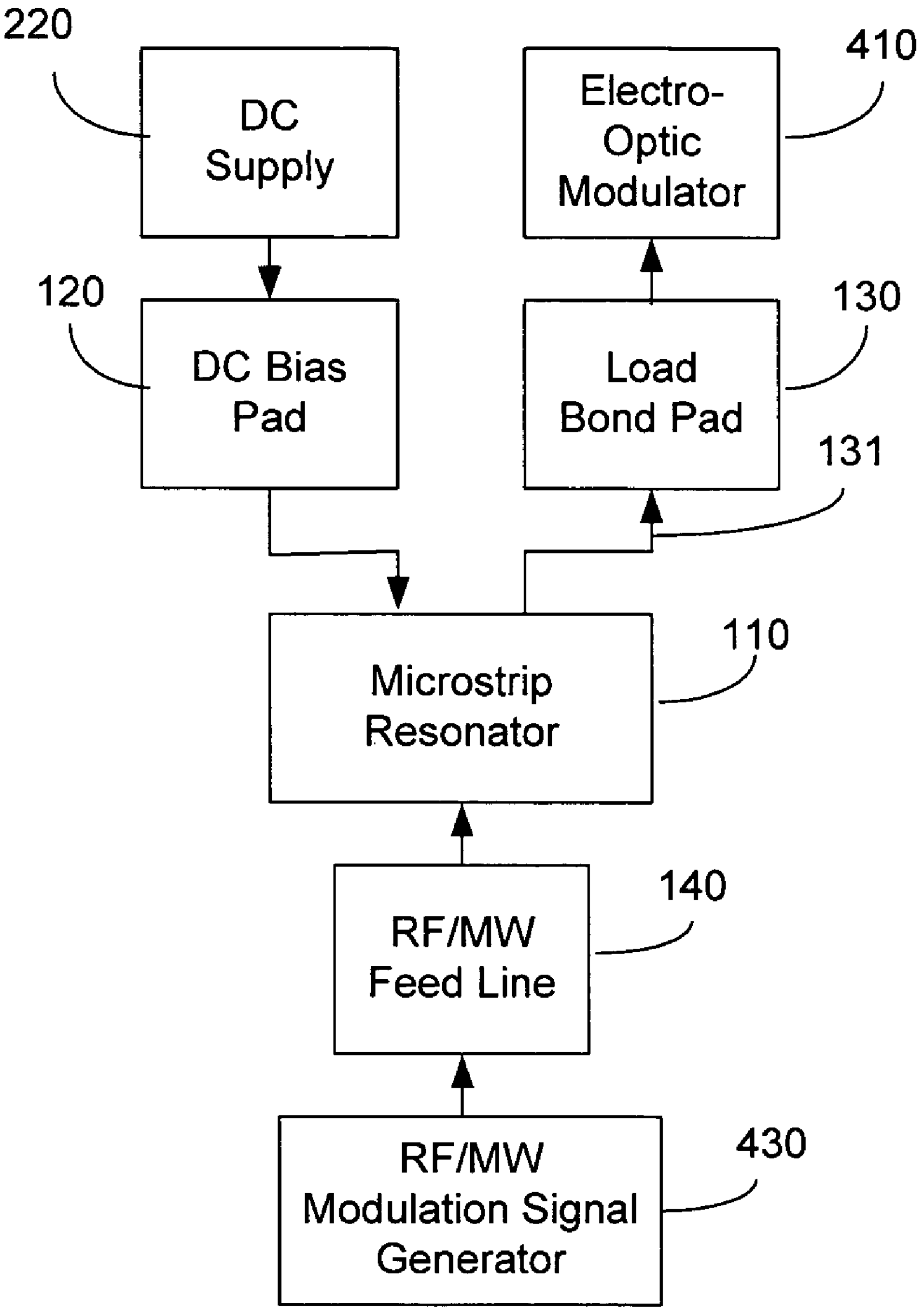
FIG. 4 illustrates another application of the RF or microwave device in FIG. 2 to an electro-optic modulator.

FIG. 4 shows another example of the device in FIG. 2 where an electro-optic modulator 410 is used as the device 210 in FIG. 2 and a modulation signal generator 430 is used as the device 230 in FIG. 2. The modulator 410, which may be a Mach-Zehnder electro-optic modulator, modulates light in response to a microwave or RF modulation signal under a proper DC bias. The DC bias is supplied by the microstrip 110. The modulation signal is generated by the generator 430, coupled to the microstrip resonator 110, and is applied to the modulator 410 through the load bond pad 130.

The λ/2 resonator shown in FIGS. 1A, 1B, and 3B is one example of the microstrip resonator shown in FIGS. 2, 3A, and 4. As another example, a λ/4 resonator may be used as the microstrip resonator. For low impedance devices (e.g., $Z_L$<10 Ohm) the utilization of the λ/2 matching may be inconvenient because the location of the load contact connection point 112 (X0) moves too close to the center 111 of the resonator strip and may interfere with the DC connection line 121. In this case, a λ/4 resonance matching scheme may be used to provide the DC bias, the DC block, and the impedance matching for low-impedance devices connected to the load bond pad 130.

Figure 5:
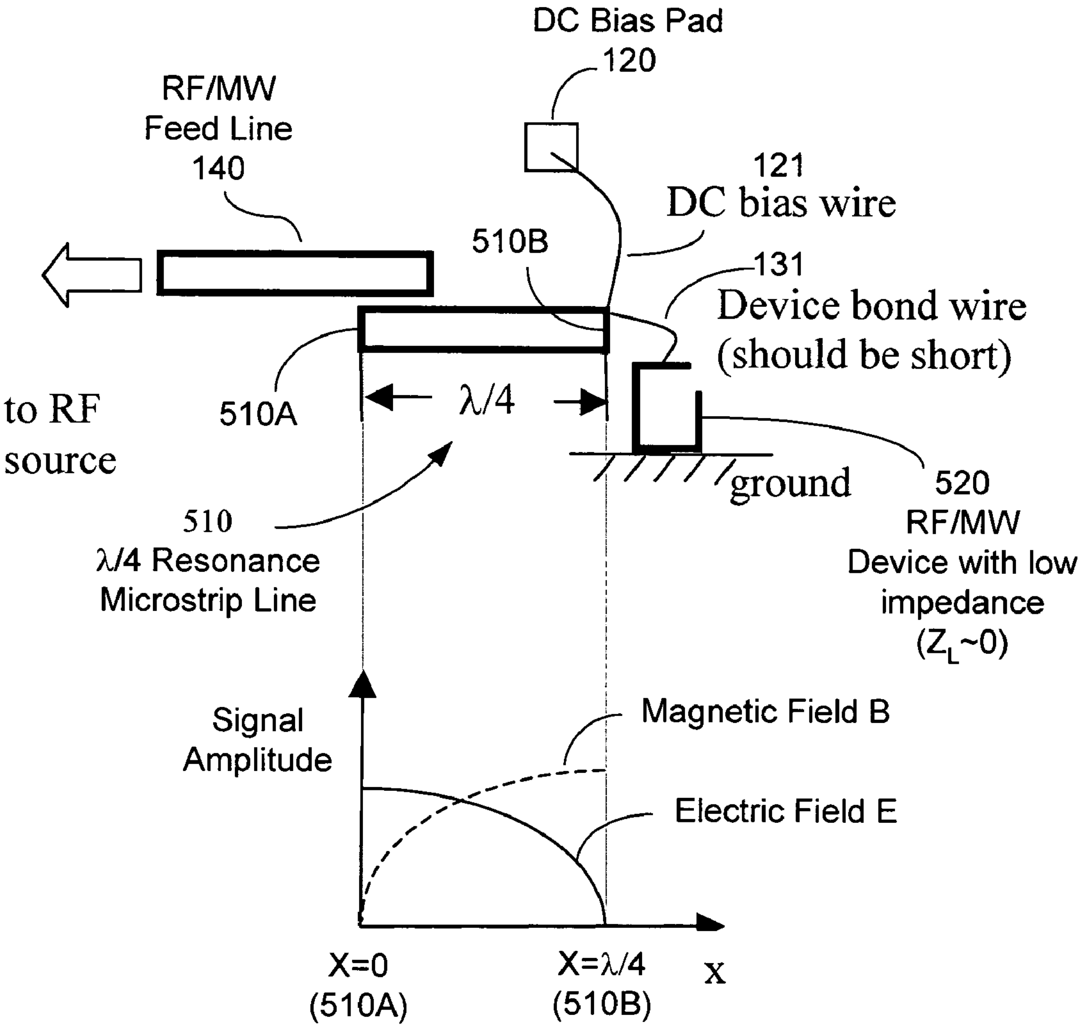
FIG. 5 shows another example of the microstrip resonator line shown in FIG. 2 where a λ/4-short microstrip line is used for low impedance devices.

FIG. 5 shows an example of a microwave or RF device using a λ/4 microstrip resonator 510 having two ends 510A and 510B. The feed line 140 is gap or side coupled to the end 510A and a microwave or RF device 520 with a low impedance is connected via the wire 131 and the load bond pad 130 to the other end 510B of the resonator 510. The lower part of FIG. 5 shows a graph of the spatial distributions of the magnetic field (dashed line) and the electric field (solid line) of the RF or microwave signal in the resonator 510. The electric field E has a node at the end 510B under the resonance condition. Accordingly, the DC bias is connected to the same end 510B of λ/4-length microstrip resonator 510 where the load is connected to reduce any influence of the DC bias to the signal. As such, this design forms a nearly short-circuit termination.

This configuration may be especially convenient when the second electrode of the load device 520 is on the bottom side of the device, which is quite common for various semiconductor devices. The reactance of the load affects the effective length of the resonator 510 and should be taken into account of the design. Since the resistance of the load 520 is fully connected to the resonator 510, the Q-factor of the loaded λ/4 resonator is typically lower than in the λ/2 scheme shown in FIGS. 1A and 1B. In comparison to the device in FIGS. 1A and 1B, the device in FIG. 4 has a wider bandwidth of matching due to the reduced Q factor. Since the resonator microstrip 510 is galvanically disconnected from the feed line 140, the scheme also provides DC blocking function. Therefore, the design in FIG. 4 is limited to applications with the low impedance load devices, the suggested scheme provide simple, easily tunable, compact solution for impedance matching with “Bias-T” functionality.

The techniques described above are applicable to microwave or RF resonators in other configurations including other planar configurations not specifically described here and non-planar configurations. Under a resonant condition, a microwave or RF resonator made from a conductor material is in resonance with a microwave or RF signal at a particular signal wavelength. The electric field within or supported by the resonator has one or more nodes where the electric field is minimum or zero. A bias conductor may be connected to the resonator to supply a DC bias voltage to a node location so as to minimize any disturbance to the resonant microwave or RF field of the resonator. A microwave or RF circuit operates at the signal wavelength may be connected to the resonator via a signal conductor to apply the DC bias voltage to the circuit. Through this same signal conductor, the circuit and the resonator can also exchange the microwave or RF energy. The contact location of the signal conductor on the resonator may be selected to provide the desired impedance matching.

In addition, a microwave or RF feed line may be DC insulated from the resonator but is AC coupled to the resonator to supply the microwave or RF signal to the resonator or to receive the microwave or RF signal from the resonator. The interaction length of the resonator may be designed to be resonant with the microwave or RF signal. For example, the interaction length may be one half of the signal wavelength or one quarter of the signal wavelength as shown in the above microstrip resonator examples.

Only a few implementations are disclosed. However, it is understood that variations and enhancements may be made.

What is claimed is:

1. A device, comprising:

a microstrip line having a length of one half of one wavelength of a microwave or RF signal;

a first conductive pad connected to a center of the microstrip line where the electric field of the microwave or RF signal has a node to supply a DC bias to the microstrip line;

a second conductive pad connecting a load to a selected contact location on the microstrip line; and a conductive feed line that is insulated from the microstrip line and is electrically coupled to supply the microwave or RF signal to or to receive the microwave or RF signal from the microstrip line, wherein the selected contact location on the microstrip line is selected to provide an impedance matching condition for transferring the microwave or RF signal between the conductive feed line and the second conductive pad.

2. The device as in claim 1, further comprising a pin diode connected to the second conductive pad to receive the DC bias from the microstrip line and to supply the microwave or RF signal to the microstrip line.

3. A method, comprising:

providing a microstrip feed line and a microstrip resonator that are insulated from each other in order and are coupled to each other to exchange microwave or RF energy therebetween;

supplying a DC bias voltage to a location on the microstrip resonator where the electric field of a resonance microwave or RF signal has a node; and connecting a load to the microstrip resonator at a location to provide a impedance matching for exchange the microwave or RF energy with the feed line and to receive the DC bias from the microstrip resonator.

4. The method as in claim 3, further comprising using a microstrip line with a length of one half of the wavelength of the microwave or RF energy as the microstrip resonator.

5. The method as in claim 4, further comprising connecting the DC bias voltage at the center of the microstrip line.

6. The method as in claim 5, further comprising selecting the location for connecting the load on the microstrip line to be between the center and an end of the microstrip line.

7. The method as in claim 3, further comprising using an optical detector as the load to receive the DC bias voltage and to supply an output of the detector to the microstrip line.

8. The method as in claim 7, wherein the optical detector is a pin diode.

9. The method as in claim 3, further comprising using a transistor as the load to receive the DC bias voltage.

10. The method as in claim 3, further comprising:

using an optical modulator as the load to receive the DC bias voltage; and supplying a microwave or RF modulation control signal to the optical modulator via the microstrip line.

11. The method as in claim 3, further comprising using a microstrip line with a length of one quarter of the wavelength of the microwave or RF energy as the microstrip resonator.

12. The method as in claim 11, further comprising connecting the DC bias voltage and the load to one common end of the microstrip line.

13. A device, comprising:

a microstrip feed line to transmit microwave or RF energy;

a microstrip resonator positioned to be insulated from the microstrip feed line and coupled to exchange microwave or RF energy with the microstrip feed line;

a bias conductor wire connected to the microstrip resonator to supply a DC bias voltage to a location on the microstrip resonator where the electric field of a resonant microwave or RF signal has a node; and a signal conductor wire connected to the microstrip resonator at a location to provide an impedance matching for exchanging the microwave or RF energy with the feed line and to receive the DC bias from the microstrip resonator.

14. The device as in claim 13, wherein the microstrip resonator comprises a microstrip line with a length of one half of the wavelength of the microwave or RF energy.

15. The device as in claim 14, wherein the bias conductor wire is connected at the center of the microstrip line.

16. The device as in claim 15, wherein the signal conductor wire is connected between the center and an end of the microstrip line.

17. The device as in claim 13, further comprising an optical detector connected to the bias conductor wire to receive the DC bias voltage and connected to the signal conductor wire to supply an output to the microstrip line.

18. The device as in claim 17, wherein the optical detector is a pin diode.

19. The device as in claim 13, further comprising a transistor connected to the signal conductor wire.

20. The device as in claim 13, further comprising an optical modulator to the signal conductor wire to receive the DC bias voltage and to receive a microwave or RF modulation control signal from the microstrip line.

21. The device as in claim 13, wherein the microstrip resonator comprises a microstrip line with a length of one quarter of the wavelength of the microwave or RF energy.

22. The device as in claim 21, wherein both the signal and bias conductor wires are connected to one common end of the microstrip line.

23. A device, comprising:

a microwave or RF resonator comprising a conductor material and in resonance with a microwave or RF signal at a signal wavelength;

a bias conductor connected to the resonator to supply a DC bias voltage to a location on the resonator where the electric field of the resonant microwave or RF signal has a node;

a microwave or RF circuit operates at the signal wavelength; and a signal conductor connecting the circuit to the resonator to apply the DC bias voltage to the circuit, wherein the signal conductor is connected to the resonator at a location to provide an impedance matching for exchanging the microwave or RF energy between the resonator and the circuit.

24. The device as in claim 23, wherein the resonator is a planar microwave or RF resonator.

25. The device as in claim 24, wherein the resonator is a microstrip line resonator.

26. The device as in claim 25, wherein the microstrip line resonator has a length of one half of the signal wavelength.

27. The device as in claim 26, wherein the microstrip line resonator has a length of one quarter of the signal wavelength.

28. The device as in claim 23, wherein the resonator is a non-planar microwave or RF resonator.

29. The device as in claim 23, wherein the resonator has an interaction length of one half of the signal wavelength.

30. The device as in claim 23, wherein the resonator has an interaction length of one quarter of the signal wavelength.

* * * * *